Dec. 30, 1969 H. NELSON 3,487,384

SEGMENTED SENSING SYSTEM FOR A MAGNETIC MEMORY

Filed April 15, 1966 2 Sheets-Sheet 1

INVENTOR.
HERBERT NELSON

BY [signature]
AGENT

SEGMENTED SENSING SYSTEM FOR A MAGNETIC MEMORY

Filed April 15, 1966

2 Sheets-Sheet 2

INVENTOR.
HERBERT NELSON
BY
[signature]
AGENT

United States Patent Office 3,487,384

Patented Dec. 30, 1969

3,487,384

SEGMENTED SENSING SYSTEM FOR A MAGNETIC MEMORY

Herbert Nelson, Kingston, N.Y., assignor to Ferroxcube Corporation of America, Saugerties, N.Y., a corporation of Delaware Filed Apr. 15, 1966, Ser. No. 542,953

Int. Cl. G11b *5/00*

U.S. Cl. 340—174 10 Claims

ABSTRACT OF THE DISCLOSURE

A segmented sensing system for a magnetic memory having a planar array of magnetic element arrangements in rows and columns and including a plurality of sensing windings coupling different ones of the magnetic elements in the array to a common amplifier. Each segment is individually energizable for providing an indication of information in any of the elements associated with the segments.

Figures 1, 2, 3, 4:
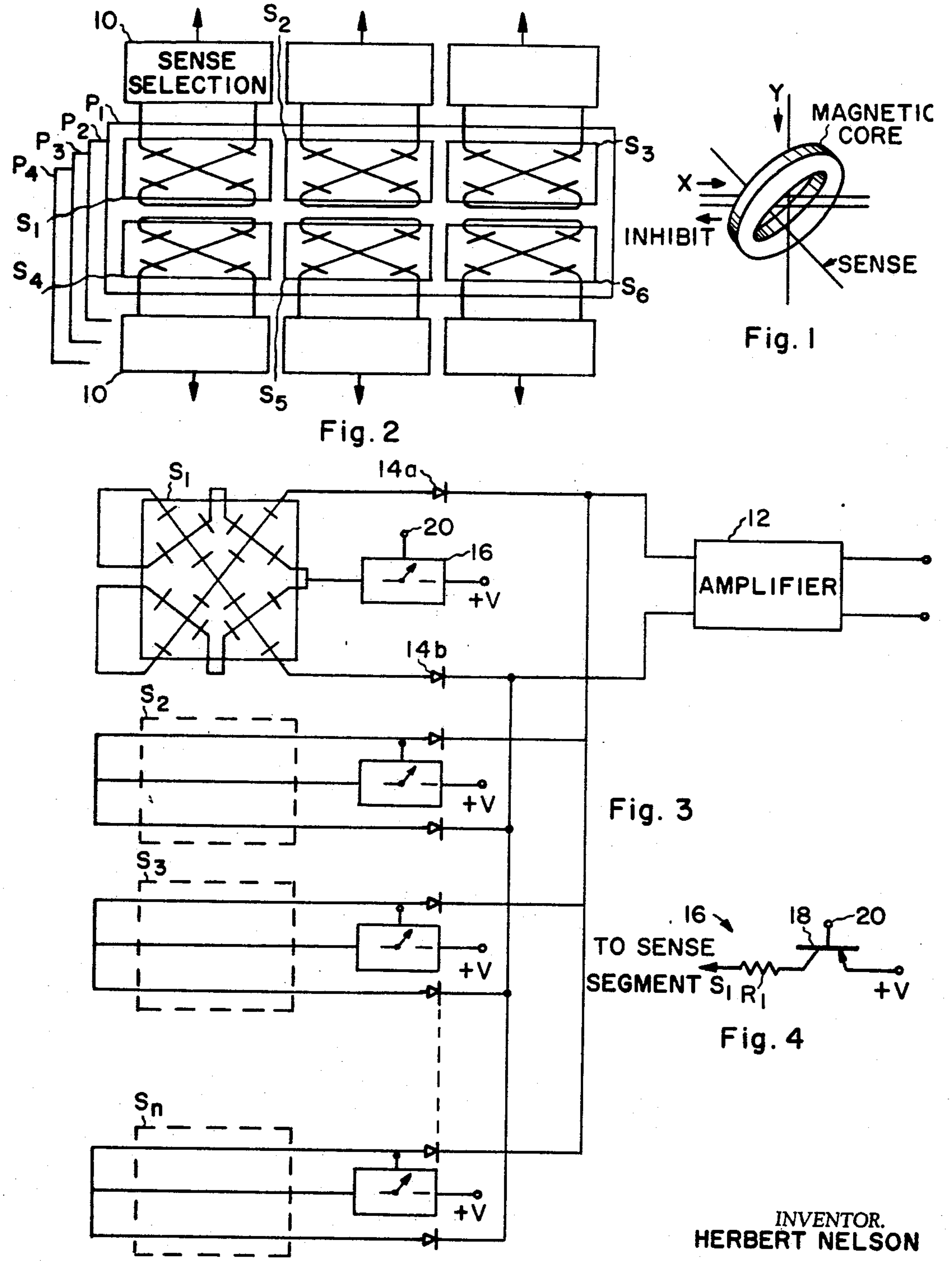

This invention relates to magnetic memory systems and particularly to sense or readout equipment for large capacity memories.

One of the most popular and least expensive modes of storing digital information today is found in the application of magnetic memory systems. A typical magnetic memory system contemplates the use of a plurality of bistable magnetic elements arranged in a two-dimensional X and Y array, each magnetic element representing a single unit or bit of information. Each array constitutes a word storage depository having as many words as there are elements on the array, each of these words being one bit in length. Since computer systems are capable of dealing in words having much more than one bit lengths, the word length storage capacity of a magnetic memory system is increased by the addition of further arrays, each similar to the one described above, arranged on a plurality of planes which may be positioned one behind the other in the form of a stack. Each bistable magnetic memory element on an array is uniquely addressed by the application of known techniques such as coincident current pulsing or linear word selection, whereby each magnetic memory element is coupled to at least a first and second conductor each carrying a current pulse of one half the required selection magnitude. Upon the coincidence of two half selection magnitude current pulses, the remanent condition of the selected magnetic element will be affected as desired. Because each magnetic memory element may be uniquely pulsed, an entire memory array may have only a single bistable magnetic element undergoing a change of state at any one period of time. This being particularly true during the readout portion of the addressing cycle, a single output winding is often used to couple all of the bistable magnetic elements on an array. In high-capacity memory systems having a large density of memory elements constituting a single array, those memory elements which are nonselected will induce current pulses in the output winding due to the effect of half-select current pulses in sufficient quantity to reduce the quality of the information signal below acceptable limits. Further, with a greater number of memory elements, the sense or output winding must have a greater length, thereby increasing the amount of noise level built up during the readout cycle. Accordingly, a substantially reduced signal to noise ratio results, to the detriment of the readout signal quality.

One solution to this problem is to segmentize the memory array into a plurality of areas of magnetic elements, each area having its own sense winding, the size of the areas being limited to that which will give a readout signal of desired quality. However, the duplication of readout electronics needed for each sense winding becomes prohibitively expensive, as well as increasing the possibility of equipment failure.

It is accordingly a primary object of the invention to provide a novel arrangement for reading information out of a segmentized magnetic memory plane.

It is a further object of the invention to provide a relatively simple and economic arrangement for reading information out of a segmentized magnetic memory plane without unnecessary duplication of equipment.

It is a still further object of the invention, to provide a novel circuit arrangement which will aid in the readout of information from a magnetic memory to the exclusion of noise and other irrelevant transients, thereby improving signal quality.

The present invention recognizes that only one element is being read or sensed per unit time in an entire memory array. In the segmented memory array described above, this would mean that only the sense equipment associated with the particular segment containing the magnetic element being sensed is currently utilized. Accordingly, the present invention contemplates a segmented memory array having a sense winding associated with each segment, and a switching circuit connected to each of the sense windings. The switching circuit serves to couple only that segment having the information to be sensed to the associated sense electronics for the actual readout operation. Where many segments are involved, there may be provided a separate amplifier having switch-coupled thereto one group of the plurality of segments. The output from each of the amplifiers may each be coupled to a common output load. The latter coupling may take the form of a multiprimary transformer, or the equivalent, having a single secondary. For improvement of common mode rejection figures, the amplifiers may be of the differential variety, providing a differential output to each associated primary transformer winding.

The output of the transformer may be coupled to a threshold rectifier which will only allow an output signal clearly rising above a predetermined noise level. The output of the rectifier may in turn be coupled to a pulse-gated amplifier or the like which permits an output only in the time period defined by the gating pulse. This further aids in eliminating ragged edged pulses, extraneous noise levels, and the like.

Figures 5, 6, 7:
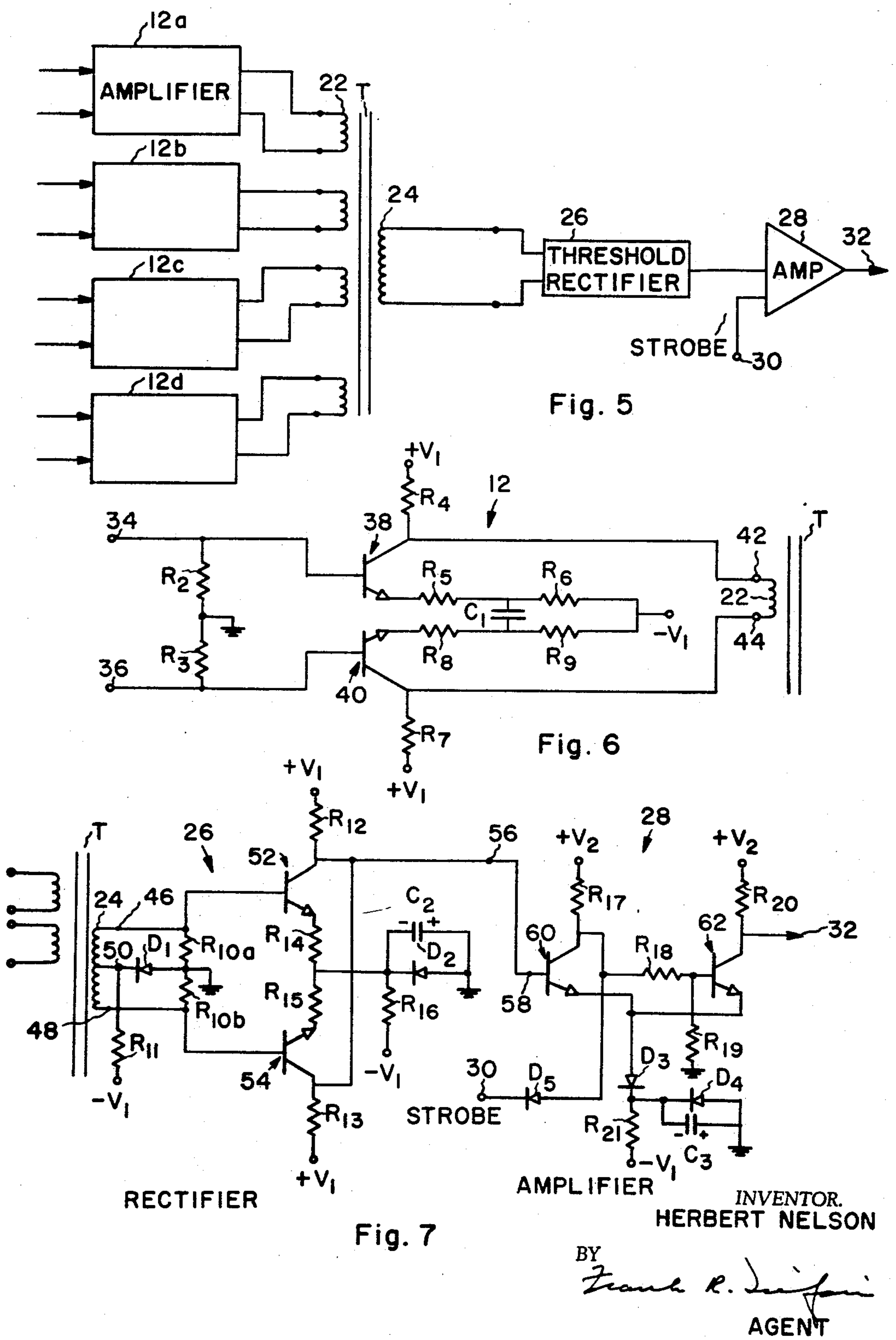

The foregoing description, as well as further objects and advantages of the invention, will become more apparent from the following exemplary embodiments detailed in the appended description and illustrated in the drawings, wherein: FIG. 1 is a perspective illustration of a standard method of wiring a magnetic memory core; FIG. 2 is a diagrammatic representation illustrative of a multiple section magnetic memory array illustrated as a plane and stack, together with associated output equipment; FIG. 3 is a schematic representation of a segment switching arrangement in accordance with the present invention; FIG. 4 is a schematic illustration of a preferred embodiment of a switching circuit which may be utilized in accordance with the present invention; FIG. 5 is a block diagram of a readout equipment which may be utilized in accordance with the present invention; FIG. 6 is a detailed schematic diagram of the differential amplifiers which may be utilized in accordance with the present invention; and FIG. 7 is a detailed schematic diagram of the rectifier and amplifier assemblies which may be utilized in accordance with the present invention.

Referring to FIG. 1 there is illustrated a magnetic storage device which may be in the form of a core or toroid composed of a suitable ferrite material having bistable magnetic properties. It is understood however that such storage devices may take other forms, such as thin magnetic films, twistors, or the like, and that the present invention is not limited in application to a magnetic core. In a typical memory system such as is contemplated by the present invention a plurality of bistable magnetic devices are arrayed on a single plane, several of these planes being arranged one behind the other to form the complete system. As is shown in FIG. 1, the common coincident current pulsing arrangement contemplates the threading of each of the cores with an X address wire, a Y address wire, an inhibit wire, and a sensing or output wire. It is understood however, that other forms of coincident current wiring arrangements such as word-organized arrays and so-called "2½–D" arrays are within the scope of this invention. Suitable addressing circuits are coupled to the X, Y and inhibit wires so as to provide a means for gaining access to a single selected core within a three-dimensional grouping or stack of cores for the purpose of inserting or removing data.

The sensing or output wire provides an indication of the core contents during the readout portion of the addressing cycle. As explained, in the formation of a complete memory system each of these cores are arranged upon a planar surface in the form of a two-dimensional array, each of these arrays or planes arranged one behind the other to form a complete stack, illustrated in FIG. 2 by the plane designations *p*1, *p*2, *p*3 and *p*4 etc. It will be understood that more than one array may be arranged on a single planar surface, but for purposes or convenience herein, each plane will be treated as a single array. In order to minimize the noise induced upon a sense winding by various factors including the presence of half select currents in the non-selected cores, a large capacity memory plane such as is contemplated by the present invention is divided into a plurality of segments illustrated as *s*1 to *s*6 on plane *p*1 in FIG. 2.

In high capacity memory systems each of the segments *s* may contain as many as 4096 individual magnetic storage elements; each plane of such a typical high capacity system would consist of 32 such segments; each such plane therefore would represent a total capacity of 131,072 words of one bit length. In practical application, a memory system may consist of 64 such planes thereby giving each word a bit length of 64 bits. It is to be understood that these figures are exemplary only and are presented to illustrate the background of such conventional high density memory systems.

Referring aagin to FIG .2 each segment *s* provided with a sense-winding threading each of the cores of that particular segment. The address windings are not shown for the purpose of clarity. Each sense winding is connected to a sense selection circuit 10 associated with the particular segment being sensed. Each sense selection circuit is coupled to an input-output register for the utilization of the sensed information since only one core in the entire plane is being read at any particular time, the sense selection circuits associated with segments not containing the particular core being sensed at the particular time are not in use. In order to overcome the disadvantages of duplication of expensive equipment not actually required, the arrangement of FIGURE 3 is employed whereby a plurality of sense segments *s*1 *s*2 *s*3 . . . *sn* are uniquely coupled to a single amplification unit 12.

Where many segments are formed, it may be convenient to arrange each of the sensing segments on the plane *p*1 into a plurality of groups, each of the plurality of groups connected to one of a plurality of amplifiers. The number of segments in each group will depend upon such factors as noise, loading, and the convenience of biasing arrangements. Using, for example, a high density storage system having 32 segments, the segments may be arranged such that there are 8 segments in each group, resulting therefore in a total of 4 groups of 4 amplifiers.

Each of the sense segments is coupled to its appropriate amplifier by means of a unilaterally conducting device such as a diode, illustrated in FIG. 3 as elements 14*a* and 14*b*. Biasing and diode polarization are such that each of the diodes connecting the sensing segments to its respective amplifier are blocked or non-conducting so that a signal originating in any of the sense segments which is insufficient to overcome the blocking potential placed on such diodes would not reach the respective amplification units. When a specific storage device located in one of the segments undergoes a change of state which is to be sensed by an appropriate segment sense winding, the induced potential on such sense windings will unblock its associated diode, rendering it conductive and thereby transmitting the sensed signal to an associated amplifier. The amplifier is not loaded by the remainder of the sense segments due to the isolation effect of the remainder of the diodes coupling the remainder of the segments to the amplifier.

In order to ensure diode unblocking when the sense signal occurs on a sense winding, it is preferable to include a switching circuit 16 for each segment sense winding which will provided an unblocking potential at the proper time. Since there may be some noise level induced by the unblocking potential, it is preferable that the switch be energized prior to the time of sensing, thereby allowing time for any unblocking noise to die out. Such a switching circuit may take any form required to accomplish its stated function and a preferred form of such a circuit is illustrated in FIG. 4 wherein there is provided a transistor 18 which is in a normally cut off condition. When a switching signal is applied to the switching terminal 20 a potential sufficient to unblock the diode units 14*a* and 14*b* is conducted through a limiting resistance $R_1$ and along the sense winding through the sense segment to the diodes. In this condition the sensed signal will pass from a sense segment to its respective amplifier through the unblocked diodes 14*a* and 14*b*.

Each of the amplifier units 12*a*, 12*b*, 12*c*, 12*d* is connected to a common output unit which, as shown in FIG. 5, may consist of a transformer T having a plurality of primaries 22 each of which is respectively connected to the output of each of the amplifiers 12*a–d*. Transformer T is provided with a single secondary winding 24. Since only one of the amplifiers carries an output signal, three of the primaries as well as the secondary acts as a load and the one primary carrying the signal acts as a signal source. The loads therefore will be similar, balanced, and substantially constant on the output of the amplifier in operation at any particular moment. The transformer acts as an AC coupling device which can be referenced to a potential differing from the quiescent DC potential in the amplifier units, thereby eliminating the need for DC restoration circuits or buffer circuits. The use of a transformer system provides an increase in the common mode rejection available when the amplifier units are employed as differential amplifiers.

The transformer secondary 24 is connected to a threshold rectifier circuit 26 and from there to an amplifier circuit 28 which in turn is gated to provide an output pulse upon the coincidence of an input pulse thereto and a strobe pulse, applied to terminal 30. The purpose of the strobe pulse is to provide an output pulse on line 32 of a duration compatible with the system handling capability. The output present on line 32 represents information sensed somewhere on the memory plane. In an actual system the combined aramgements of FIGS. 3 and 5 would be multiplied by the number of planes in a particular stack employed in a memory.

Referring now to FIG. 6, there is shown a preferred embodiment of the differential amplifier stage which may be used in accordance with the present invention. The differential amplifier unit contain first and second transistors 38 and 40, illustrated as NPN types each having emitter, base and collector electrodes. The base electrodes of transistors 38 and 40 are respectively coupled to input terminals 34 and 36 by means of a pair of base biasing resistors R2 and R3, reference to ground. Biasing voltages +V1 and —V1 are applied to the transistors 38 and 40 by means of resistances R4, R5, and R6, and resistances R7, R8, R9, respectively. A capacitor C1 is provided in the emitter biasing circuits of transistors 38 and 40. The use of capacitor coupling in the emitters of transistors 38 and 40 enables the circuit to achieve a relatively high AC gain with a low DC gain thereby improving bias stability. Each of the outputs of the transistors 38 and 40, derived from the collectors thereof, are coupled to the input terminals 42 and 44 respectively of an appropriate primary winding of the transformer T.

Referring now to FIG. 7 there is shown a preferred embodiment of a threshold rectifier 26 which couples the secondary winding 24 of the transformer T to the amplifier circuit 28. In accordance with a preferred embodiment, the secondary winding 24 is terminated by first and second terminals 46 and 48 and includes a center tap terminal 50. The rectifier stage itself consists of first and second transistors 52 and 54 each having emitter, base and collector electrodes. The base electrodes of each of the transistors 52 and 54 are respectively coupled to transformer terminals 46 and 48 by means of base biasing resistance R10*a* and R10*b*, commonly referenced to ground. A further bias potential —V1 is applied through a resistance $R_{11}$ to the center tap terminal 50 of the transformer secondary 24. A diode $D_2$, polarized in the forward direction, is connected between the center tap terminal 50 and ground. Transistors 52 and 54 are biased by voltages +V1 applied to the collector electrodes of the respective transistors by resistance R12 and R13, while the emitters of the respective transistors 52 and 54 are coupled by resistances R14 and R15. The biasing network is completed by the application of a potential —V1 through a resistance R16 to the junction point of resistances R14 and R15, to which is further connected one end of a diode $D_2$ polarized in the forward direction, the other end of which is grounded.

In operation, both transistors 52 and 54 are initially reveresed biased. The biasing network is designed such that an input signal appearing on the secondary 24 of the transformer T will be sufficient to overcome the base to emitter offset or threshold voltage of the rectifier stage. The presence of a sufficient input signal will cause one or the other transistor 52 or 54 to conduct thereby allowing an output signal, through the common collector junction, to appear at the output terminal 56 of the rectifier stage 26. The slight voltage drops across each of the diodes $D_1$ and $D_2$, resulting in a slightly negative potential thereacross, serves to compensate for the emitter-base diode voltage drop of the transistors, thereby insuring that the saturation state of either of the transistors will cause the output voltage at saturation to approach ground levels.

The output signal from the terminal 56 of the threshold rectifier is supplied to the input terminal 58 of the strobe amplifier 28 which is basically a modified Schmitt trigger. The circuit 28 is effectively a regenerative bistable circuit and serves to function as an amplitude comparator indicating by one or the other of its stable states whether or not the signal input at the terminal 58 exceeds a specific reference level. Structurally, the circuit includes first and second transistors 60 and 62 each including emitter, base and collector electrodes, coupling between the first and second stages being accomplished by resistances R17, R18, and R19. Biasing to the collector stage of the transistor 60 is applied by potential V2 through resistance R17, while biasing to the collector of the transistor 62 is provided by a potential V2, applied through resistor R20. Regenerative feedback is obtained through diode D3 which is connected to ground potential through capacitor C3. Resistance R21 is coupled to the common emitter connection of transistors 60 and 62 by means of a diode D3 and to a point of reference or ground potential by a diode D4. The collector of transistor 60 is normally clamped to a potential source of approximately ground potential by means of a diode D5. Under quiescent conditions the transistors 52 and 54 of the threshold rectifier stage are in a cut-off state and the current flow through R12 will be directed toward point 58 and be utilized to supply the base current to maintain transistor 60 in a saturated state of conduction.

The potential at the junction point of the resistance R21 and the diode D4 is approximately ground potential plus the voltage drop across the diode D4. This voltage drop is absorbed by the voltage drop across the diode D3, thereby placing a potential approximately equal to the ground potential at the junction points of the emitters of transistors 60 and 62. The voltage at the collector of the transistor under such conditions will be approximately equal to the potential at the emitter of the transistor 60, or the ground potential. Resistances R18 and R19 form a voltage divider but the potential difference between the voltage of transistor 60 and the base of transistor 62 is very small so that the potential at the base of transistor 62 is approximately ground potential. Since the emitter of transistor 62 is at approximately the same potential, the base emitter threshold voltage of this transistor has not been overcome, and therefore the transistor 62 under quiescent conditions will be in its cut-off condition, and the collector electrode thereof will be at a potential approximately equal to +V2. This state will represent, in terms of sensed information, a logical "zero." When an information pulse appears at the secondary 24 of the transformer T, one of the transistors 52 or 54, depending upon the polarity of the sensed information, will be rendered conductive. The current through R12 will be diverted from the base of the transistor 60 to form the collector current of transistor 52 or 54, whichever is rendered conductive, resulting in transistor 60 being back biased and therefore cut off. Normally, this would in turn result in a high positive potential approximately equal to +V2 appearing at the collector of the transistor 60, thereby causing the transistor 62 to be rendered conductive. However, the presence of the ground or reference potential at the strobe input of the diode D5 clamps the collector electrode to its original ground reference level thereby maintaining the transistor 62 in its cut-off condition.

When it is desired to read out the information that has been sensed, a positive potential is applied to the strobe input terminal thereby back biasing the diode D5 and allowing the collector potential of the transistor 60 to rise to approximately that of the supply +V2. This results in the placing of a sufficient high positive potential upon the base of the transistor 62 to thereby render said transistor conductive, allowing the collector of the transistor 62 to drop from a value approximating +V2 to a value approximating the ground reference level. In terms of sensed information this will represent a logical "one." Thus it will be seen that the width or duration of the information pulse sensed from the strobe amplifier will be equal to the time duration of the strobe pulse applied to the diode D5. It should be noted that if a strobe pulse were applied to the diode D5 in the absence of sensed information, there would be no effect upon the output of the amplifier. The application of the strobe pulse results in an output only upon the coincidence of sensed information appearing at the base of the transistor 60. This absence of sensed information could thus be construed as a logical "zero" present at the output of the transistor 62. Capacitors C2 and C3, which may be of the electrolytic variety are shunted across the diodes D2 and D4 to compensate for any spikes or transient pulses produced by the sudden conduction or non-conduction of these diodes as well as providing a low-impedance signal path to ground. It should be further observed that the diodes D1 and D2, D3 and D4 are provided within the rectifier amplifier circuits to compensate for the DC level shifting effect of the voltage drops in each of the base emitter junctions of the transistors 52, 54, 60 or 62. The presence of these diodes ensure that final output pulse will be returned as closely as possible to a zero or ground reference level, thereby eliminating the necessity of buffer circuitry between the amplifier and the remainder of the logical circuit such as the registers or other recording information which may be themselves referenced to such a level. In the absence of a concern for these factors, these diodes may be satisfactorily eliminated, and the embodiment represented in each of these circuits remain suitably effective. Potentials +V2 and +V1 may be supplied from any form of a suitable source, such as batteries, an AC to DC converter, or the like. It is also noted that the transformer T need not be the single core multiple primary single secondary type illustrated but may be a plurality of single primary-single secondary transformers, each of the secondaries of which are connected to the input of a rectifier threshold-amplifier circuit of the type herein illustrated. It is further noted that terminals 42, 44, 46, 48, 50, 56 and 58 are merely designations of structural descriptive convenience and it is understood that they do not form any part of the present invention. Finally, it is noted that the transistor polarities as well as the particular diode polarities may be altered by changing the various potential polarities, without exceeding the intended scope of the present invention.

Further variations, alterations and modifications of the foregoing described preferred embodiments of the present invention may be employed or substituted within the scope of the present invention by those skilled in this art.

What is claimed is:

1. In a sensing system for a magnetic memory, the combination comprising at least one planar array of bistable magnetic elements arranged in rows and columns, selectively operable addressing means including a set of coordinate drive lines commonly coupled to all of said elements in said array for selecting information from any desired one of said elements therein, a plurality of sensing segments, each of said segments being coupled to one portion of the bistable magnetic elements of said planar array for detecting said sensed information of any of the bistable magnetic elements located within said portion, said drive lines thereby commonly coupling more than one of said segments, first switching means connecting each of said segments to an amplifier, said switching means isolating every segment from said amplifier, second switching means for overcoming said first switching means isolating and selectively connecting that segment containing sensed information to said amplifier, and output means connected to the output of said amplifier for indicating the said change of state.

2. In a sensing system for a magnetic memory, the combination comprising a plurality of memory arrays, each said memory array arranged on a plane and having a plurality of bistable magnetic elements arranged in rows and columns, selectively operable addressing means including one set of coordinate drive lines commonly coupled to all of said elements in each said array for effecting a change of state in any desired one of said elements therein, a plurality of groups of sensing segments, one of said groups for each respective one of said planes, each of said groups including a plurality of segments, each of said segments being coupled to one portion of the bistable magnetic elements of said memory array plane for detecting sensed information in the form of a change of state of any of the bistable magnetic elements located within said poirton, each of said sets of drive lines thereby commonly coupling more than one of said segments, means connecting each of said groups to a one of a plurality of amplifiers, said means isolating every segment within each group from its respective amplifier excepting that segment containing the bistable magnetic element undergoing the change of state to be sensed, and output means common to the outputs of all of said amplifiers for indicating the said change of state.

3. The combination of claim 2 wherein said means includes at least one unilaterally conducting device connected between each of said sense segments and its resyective amplifier, said device normally back biased in the absence of sensed information and forward biased in the presence of sensed information.

4. The comibnation of claim 3 further including selectively operable bias switching means connected to each of said sense segment, said switching means being operable to apply forward bias to the said unilateral conducting means associated with that portion of said bistable magnetic elements containing the element undergoing the sensed change of stage.

5. The combination of claim 2 wherein said output means comprises a transformer having a plurality of primary windings, each of said primary windings being connected to the output of one of said amplifiers, and a secondary winding, a strobe amplifier, and means connecting said strobe amplifier to said secondary winding.

6. A bit sensing system for a magnetic memory comprising a memory plane having a plurality of bistable magnetic elements arranged in rows and columns, selective addressing means coupled to each of said magnetic elements for effecting a change of state in the element addressed, said elements arranged on said plane in a plurality of sections, each of said sections having a sense winding threading each of the respective elements of said section for detecting sensed information in the form of a change of state of any of the bistable magnetic elements located within said section, said sense windings being arranged into a plurality of groups, a plurality of differential amplifiers, means connecting each of said groups of sense windings to a respective one of said differential amplifiers, a transformer having a plurality of primary windings and a secondary winding, means connecting each of said differential amplifiers to a respective one of said primary windings, a strobe amplifier, and means connecting said strobe amplifier to said secondary winding.

7. The combination of claim 6 wherein each of said differential amplifiers incudes first and second input terminals connected to first and second transistors, each having emitter, base and collector electrodes, means coupling said first and second input terminals to the respective base electrodes of said first and second transistors, means applying biasing potential to the respective collector and emitter electrodes of said first and second transistors, means for capactively coupling the emitter electrodes of said first and second transistors, and means connecting the respective collector electrodes of said first and second transistors to one of said primary windings.

8. The combination of claim 6 wherein said last named means includes a rectifier having first and second input terminals connected to first and second ends of said secondary winding, first and second transistors having emitter, base and collector electrodes, means coupling said first and second input terminals to the respective base electrodes of said first and second transistors, means for resistively coupling the emitter electrodes of said first and second transistors, means for applying bias to said first and second transistors for biasing said transistors in a quiescently non-conducting state and thereby establish a minimum threshold level of input signal necessary to cause conduction, an output terminal, means connecting the collector electrodes of said first and second transistors to said output terminal, and means connecting said output terminal to said strobe amplifier.

9. The combination of claim 6 wherein said strobe amplifier comprises first and second direct coupled transistors having alternative states of conduction in accordance with the magnitude of an input signal applied to one of said first and second transistors, and means clamping said one transistor in its quiescent state, said means clamping maintaining said quiescent state with the presence of an input signal of sufficient magnitude to change the state thereof, and means for applying an un-clamping signal to said transistor for allowing said transistor to change state in accordane with said input signal for a time duration dependent upon the time duration of said unclamping signal.

10. The combination of claim 9 wherein said first and second transistors each have emitter, base and collector electrodes, said input signal being applied to the base electrode of said first transistor, means for applying bias potential to the respective collector electrodes of said first and second transistors, resistive means commonly coupling the respective emitter electrode of said first and second transistor for application of further bias potential, means connecting the collector electrode of the first transistor to the base electrode of the second transistor, means connecting the base electrode of the second transistor to a point of reference potential, said means clamping connected to the collector electrode of said first transistor, and means for deriving an output from said strobe amplifier connected to the collector electrode of said second transistor.

References Cited

UNITED STATES PATENTS

| | | | |
|---|---|---|---|
| 3,096,510 | 7/1963 | Lee | 340—174 |
| 3,116,476 | 12/1963 | Goldstick | 340—174 |
| 3,181,132 | 4/1965 | Amemiya | 340—174 |
| 3,181,131 | 4/1965 | Pryor et al | 340—174 |
| 3,191,163 | 6/1965 | Crawford | 340—174 |
| 3,271,749 | 9/1966 | Vogl, Jr., et al. | 340—174 |
| 3,408,637 | 10/1968 | Gibson et al. | 340—174 |
| 3,193,807 | 7/1965 | Vinal | 340—174 |
| 3,293,626 | 12/1966 | Thome | 340—174 |
| 3,317,902 | 5/1967 | Michael | 340—172.5 |

STANLEY M. URYNOWICZ, Jr., Primary Examiner